(12) United States Patent
Grushkevich et al.

(10) Patent No.: US 9,681,463 B2
(45) Date of Patent: *Jun. 13, 2017

(54) COEXISTENCE PRIORITY SELECTION

(71) Applicant: BROADCOM CORPORATION, Irvine, CA (US)

(72) Inventors: Asif Grushkevich, San Diego, CA (US); John Stuart Walley, Ladera Ranch, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 68 days.

This patent is subject to a terminal disclaimer.

(21) Appl. No.: 14/792,504

(22) Filed: Jul. 6, 2015

(65) Prior Publication Data

US 2015/0312926 A1    Oct. 29, 2015

Related U.S. Application Data

(63) Continuation of application No. 13/864,416, filed on Apr. 17, 2013, now Pat. No. 9,107,080, which is a
(Continued)

(51) Int. Cl.
  *H04W 72/12*    (2009.01)
  *H04W 72/10*    (2009.01)
  (Continued)

(52) U.S. Cl.
  CPC ..... *H04W 72/1215* (2013.01); *H04L 12/5692* (2013.01); *H04W 16/14* (2013.01);
  (Continued)

(58) Field of Classification Search
  None
  See application file for complete search history.

(56) References Cited

U.S. PATENT DOCUMENTS 7,194,283 B2    3/2007    Kardach et al.
7,233,602 B2    6/2007    Chen et al.
(Continued)

FOREIGN PATENT DOCUMENTS

EP    1626541 A2    2/2006

OTHER PUBLICATIONS

Computer Applications, vol. 23, Dec. 2003.
(Continued)

*Primary Examiner* — Eunsook Choi
(74) *Attorney, Agent, or Firm* — McDermott Will & Emery LLP

(57) ABSTRACT

Methods and systems for auto coexistence priority selection for a SCO link are disclosed. Aspects of one method may include a first Bluetooth device communicating with a collocated WLAN device via a coexistence method. The first Bluetooth device, prior to executing a non-SCO task, which may comprise tasks that do not involve SCO packet transfer, may communicate low priority via the coexistence method if a Bluetooth SCO link is present between the first Bluetooth device and a second Bluetooth device, and if a current task being handled by the first Bluetooth device is a high priority task. If a SCO link is not present between the first and second Bluetooth devices, and if the current non-SCO task is a high priority task, the first Bluetooth device may communicate high priority via the coexistence method prior to executing the non-SCO task.

20 Claims, 6 Drawing Sheets laptop 110

PDA 120

PC 100

Related U.S. Application Data continuation of application No. 11/439,682, filed on May 24, 2006, now Pat. No. 8,442,434.

(51) Int. Cl.
*H04L 12/54* (2013.01)
*H04W 16/14* (2009.01)
*H04W 84/12* (2009.01)
*H04W 84/18* (2009.01)
*H04W 88/06* (2009.01)

(52) U.S. Cl.
CPC ........ *H04W 72/10* (2013.01); *H04W 72/1242* (2013.01); *H04W 84/12* (2013.01); *H04W 84/18* (2013.01); *H04W 88/06* (2013.01)

(56) References Cited

U.S. PATENT DOCUMENTS

| | | |
|---|---|---|
| 7,280,836 B2 | 10/2007 | Fuccello et al. |
| 7,454,171 B2 | 11/2008 | Palin et al. |
| 7,468,963 B2 | 12/2008 | Capretta |
| 7,546,404 B2 | 6/2009 | Yeh et al. |
| 7,844,222 B2 | 11/2010 | Grushkevich |
| 8,442,432 B2 | 5/2013 | Agarwal |
| 2002/0061031 A1 | 5/2002 | Sugar et al. |
| 2002/0136233 A1 | 9/2002 | Chen et al. |
| 2003/0083095 A1 | 5/2003 | Liang |
| 2004/0116075 A1 | 6/2004 | Shoemake et al. |
| 2004/0190527 A1* | 9/2004 | Okura ................ H04L 45/00 370/395.21 |
| 2004/0204031 A1 | 10/2004 | Kardach et al. |
| 2005/0059347 A1 | 3/2005 | Haartsen |
| 2005/0099979 A1 | 5/2005 | Chandra |
| 2005/0152355 A1* | 7/2005 | Henriques ............ H04L 29/06 370/389 |
| 2005/0215197 A1 | 9/2005 | Chen et al. |
| 2005/0239474 A9 | 10/2005 | Liang |
| 2005/0271010 A1 | 12/2005 | Capretta |
| 2006/0067312 A1 | 3/2006 | Ross |
| 2006/0084383 A1 | 4/2006 | Ibrahim et al. |
| 2006/0133334 A1 | 6/2006 | Ross |
| 2006/0194538 A1 | 8/2006 | Palin et al. |
| 2006/0205401 A1 | 9/2006 | Palin et al. |
| 2006/0274704 A1 | 12/2006 | Desai et al. |
| 2006/0292986 A1* | 12/2006 | Bitran ................. H04W 16/14 455/41.2 |
| 2006/0292987 A1 | 12/2006 | Ophir et al. |
| 2007/0066222 A1 | 3/2007 | Tao et al. |
| 2007/0070961 A1 | 3/2007 | Tao |
| 2007/0149150 A1 | 6/2007 | Miyazaki |
| 2007/0197256 A1 | 8/2007 | Lu et al. |
| 2007/0274273 A1 | 11/2007 | Grushkevich et al. |
| 2007/0275662 A1 | 11/2007 | Grushkevich |
| 2007/0275746 A1 | 11/2007 | Bitran |
| 2009/0069044 A1 | 3/2009 | Lintula et al. |
| 2013/0225085 A1 | 8/2013 | Grushkevich et al. |

OTHER PUBLICATIONS

Ophir, et al., "Wi-Fi (IEEE802.11) and Bluetooth coexistence: issues and solutions", Personal, Indoor and Mobile Radio Communications, vol. 2, p. 847-852, Sep. 5, 2004.

T. Godfry, "802.11 and Bluetooth Coexistence Techniques", Technical Report CMU-CS-98-105, Nov. 4, 2002.

Yunhua et al., "The Research about the Coexistence Mechanism between WLAN and Bluetooth Systems." GPS Engineering Research Center of Wuhan University. pp. 150-152.

* cited by examiner

COEXISTENCE PRIORITY SELECTION

CROSS-REFERENCE TO RELATED APPLICATIONS/INCORPORATION BY REFERENCE

This application is a continuation of U.S. patent application Ser. No. 13/864,416, entitled "Method and System for Auto Coexistence Priority Selection for a SCO Link," filed Apr. 17, 2013, which is a continuation of U.S. patent application Ser. No. 11/439,682, entitled, "Method and System for Auto Coexistence Priority Selection for a SCO Link," filed May 24, 2006, now issued as U.S. Pat. No. 8,442,434.

This application makes reference to U.S. patent application Ser. No. 11/439,776 filed on May 24, 2006.

The above stated applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for auto coexistence priority selection for a SCO link.

BACKGROUND OF THE INVENTION

Some conventional communication systems are known to support wireless and wireline communication between wireless and/or wireline communication devices. Such communication systems range from national and/or international cellular telephone systems to the Internet, and to point-to-point in-home wireless networks. Each type of communication system is designed, and hence operates, in accordance with relevant communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, for example, a cellular telephone, two-way radio, personal digital assistant (PDA), personal computer (PC), laptop computer, or home entertainment equipment, communicates directly or indirectly with other wireless communication devices. For direct communications, also known as point-to-point communications, the participating wireless communication devices tune their receivers and transmitters to the same channel, or channels, and communicate via those channel(s). Each channel may utilize one or more of the plurality of radio frequency (RF) carriers of the wireless communication system. For indirect wireless communication, each wireless communication device communicates directly with an associated base station, for example, for cellular services, and/or an associated access point, for example, for an in-home or in-building wireless network, via an assigned channel or channels.

In order for each wireless communication device to participate in wireless communication session, it utilizes a built-in radio transceiver, which comprises a receiver and a transmitter, or it is coupled to an associated radio transceiver, for example, a station for in-home and/or in-building wireless communication networks, or a RF modem. The transmitter converts data into RF signals by modulating the data in accordance with the particular wireless communication standard. However, different communication systems may use different standards, for example, the IEEE 802.11 standard and the Bluetooth standard, which may share the same RF spectrum.

In order to alleviate signal interference from sharing an RF spectrum with other communication systems, the Bluetooth standard allows frequency hopping where information is transmitted at various frequencies. In this manner, the energy of the transmitted signal is spread across a RF spectrum from 2.402 GHz to 2.480 GHz in 79 channels with each channel separated by 1 MHz. The Bluetooth standard allows 1600 frequency hops per second. The advantage of the frequency hopping system is that it spreads information across a wide band of frequencies. Therefore, signals transmitted by other systems using a portion of the same frequency spectrum may appear as noise to only some of the frequencies used by Bluetooth in frequency hopping. Similarly, only a portion of Bluetooth transmission may interfere with signals transmitted by other systems.

Two or more Bluetooth devices, up to a total of eight devices, may comprise a piconet with one master device and up to seven slave devices. The piconet may share a common communication data channel with present capacity of 1 megabits per second (Mbps) up to a theoretical maximum of 3 Mbps. This data channel is divided in to time slots of 625 microseconds. Although a master device may initiate contact with any slave device, a slave device may only respond to a master device. A piconet link between a master device and a slave device may be either synchronous connection oriented (SCO) link or asynchronous connectionless (ACL) link. The piconet may support up to three SCO links, and any remaining bandwidth may be utilized by ACL links.

In some current systems, a Bluetooth device may share a platform with a WLAN device, and this may be referred to as coexistence. For example, a device such as a cellular telephone may have integrated thereon a Bluetooth radio and a Wireless LAN radio. There are times when the Bluetooth radio and the WLAN radio may need to operate simultaneously. For example, since the Bluetooth radio and the WLAN radio are close to each other in distance, and both operate in the same frequency band, transmission by one radio may interfere with transmission from the other radio. Transmission by one radio may also interfere with reception on another radio, or reception by the Bluetooth radio and/or the WLAN radio may be interfered with by transmission by other Bluetooth radios and/or WLAN radios.

A coexistence method may be used to communicate when a Bluetooth device is collocated with a WLAN device. Accordingly, the Bluetooth device may signal when the Bluetooth device may be receiving and/or transmitting, and the WLAN device may signal when the WLAN device may be transmitting. The Bluetooth device may indicate whether high priority is desired for subsequent transmissions. The high priority may allow Bluetooth transmission without interference from a simultaneous WLAN transmission. However, the indication typically may need to be made before the start of a frame.

A coexistence method may make use of a packet traffic arbitration (PTA) unit. The PTA unit may receive the priority indications from the WLAN device and the Bluetooth device, and may determine whether the Bluetooth device or the WLAN device may have priority by signaling appropriately to the Bluetooth device and/or the WLAN device. The PTA unit may be located, for example, with the WLAN circuitry. Accordingly, the signaling from the Bluetooth device may be to the WLAN circuitry.

In certain instances, the Bluetooth device may continuously transmit at a high priority, and thereby drastically reduce operating efficiency of the WLAN device. For example, if a HV2 SCO link is established with the Bluetooth device, every other frame may be a high priority frame for the duration of the SCO link. Additionally, if the Bluetooth device also executes a page scan while the SCO link is established, the frames not used for SCO link may be used for a high priority page scan. This may effectively prevent the collocated WLAN device from transmitting until either the SCO link is finished or the page scan is finished.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for auto coexistence priority selection for a SCO link, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for auto coexistence priority selection for a SCO link. Aspects of the method may comprise a first Bluetooth device communicating with a collocated WLAN device via a coexistence method. The first Bluetooth device may communicate a low priority via the coexistence method prior to the first Bluetooth device executing a non-SCO task if a SCO link is present between the first Bluetooth device and a second Bluetooth device, and if the current non-SCO task being handled by the first Bluetooth device is a high priority task. The non-SCO task may be a task that does not involve a transfer of an SCO packet between two Bluetooth devices. The non-SCO tasks may be, for example, tasks such as Bluetooth inquiry scan and page scan. The SCO link may be a HV2 SCO link or a HV3 SCO link.

Execution of the non-SCO task may comprise transmitting and/or receiving at least one Bluetooth packet in at least one Bluetooth frame. The first Bluetooth device may operate as a master and the second Bluetooth device may operate as a slave. Alternatively, the first Bluetooth device may operate as a slave and the second Bluetooth device may operate as a master. If the Bluetooth SCO link is not present between the first Bluetooth device and the second Bluetooth device, and if the current non-SCO task being handled by the first Bluetooth device is a high priority task, a high priority may be communicated via the coexistence method prior to the first Bluetooth device executing the non-SCO task.

Figure 1:
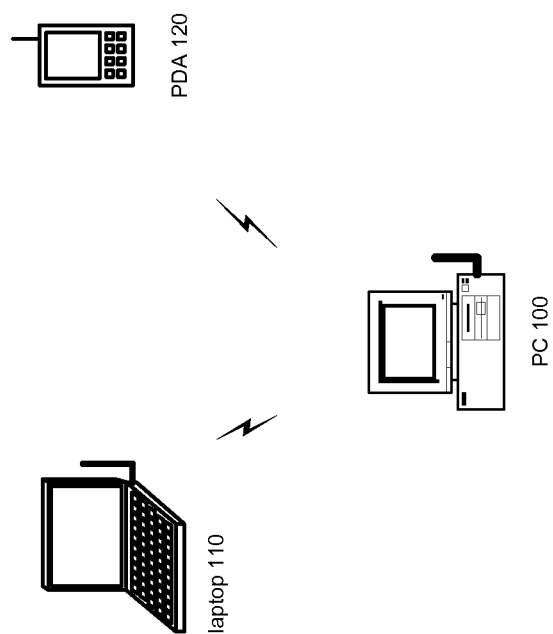
FIG. 1 illustrates a Bluetooth piconet, which may be utilized in connection with an embodiment of the invention.

FIG. 1 illustrates a Bluetooth piconet that may be utilized in connection with an embodiment of the invention. Referring to FIG. 1, there is shown a personal computer (PC) 100, a laptop 110, and a personal digital assistant (PDA) 120. These three host devices, or host platforms, may each be Bluetooth enabled. Each host device may have a Bluetooth application and a Bluetooth communication device for transmitting and receiving signals. Each host device may then be considered to be a Bluetooth device. Up to eight Bluetooth devices may communicate with each other in a local network called a piconet. In a given piconet, only one Bluetooth device may be a master, while the others may be slaves.

The process for designating a master may be a dynamic process each time a piconet is set up. A Bluetooth device may be a member of multiple piconets, where it may be designated as a master device for one piconet, and a slave device for another piconet. Each Bluetooth device may use an algorithm that takes into account different variables, for example, performance and power requirements, in deciding whether it may want to be a master device. For example, since transmitting signals to locate other Bluetooth devices to form a piconet may utilize and transmission bandwidth, a Bluetooth device may wait passively for other Bluetooth devices to try to establish a piconet. A Bluetooth device that finds other Bluetooth devices, and establishes a connection with one or more Bluetooth devices, may be designated as the master Bluetooth device for that piconet. Multiple piconets that may have connection with each other, for example, where a Bluetooth device may be a member of more than one piconet, may be referred to as a scatternet.

Although only a single piconet is illustrated, in a system comprising a plurality of piconets, it may be possible for a Bluetooth device to operate as a master device in one piconet and as a slave device in an adjacent piconet. For example, a Bluetooth device A may operate as a master device in a first piconet P1 and as a slave device in a second piconet P2. In another example, the Bluetooth device A may operate as a slave device in a first piconet P1 and as a master device in a second piconet P2. A master device, for example, the PC 100, may communicate with each of the slave devices, for example, the laptop 110 and the PDA 120. However, the slave devices may not communicate directly with each other.

When the master device moves out of range of communication, the piconet may be destroyed until another Bluetooth device establishes a piconet.

Figure 2:
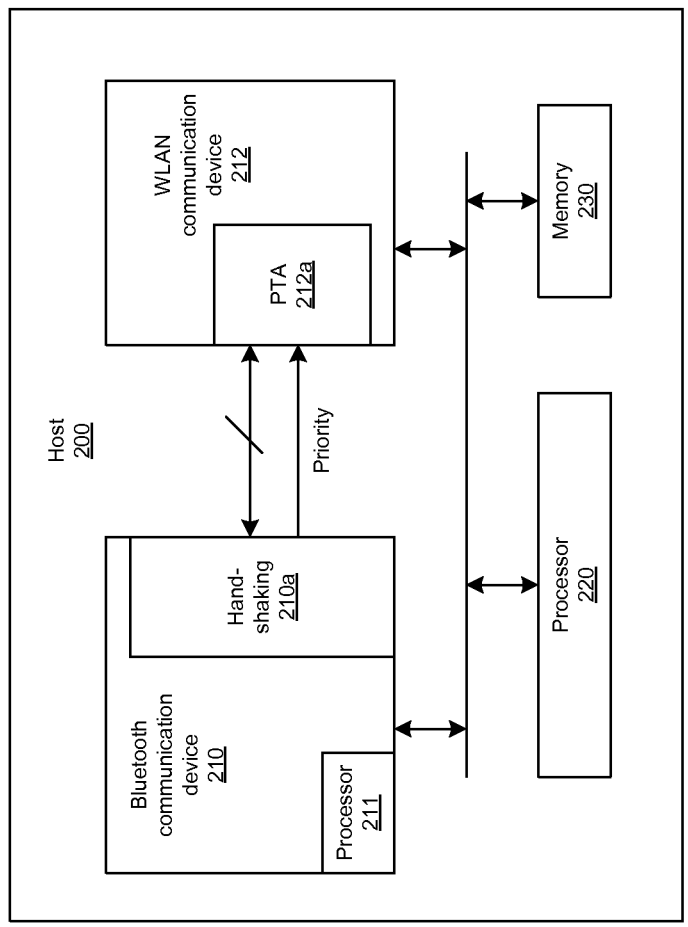
FIG. 2 is a block diagram illustrating a host device with a Bluetooth device collocated with a WLAN device, which may be utilized in accordance with an embodiment of the invention.

FIG. 2 is a block diagram illustrating a host device with a Bluetooth device and a WLAN device, which may be utilized in accordance with an embodiment of the invention. Referring to FIG. 2, there is shown a host device 200. The host device 200 may comprise a Bluetooth communication device 210, a WLAN communication device 212, a processor 220, and memory 230. The Bluetooth communication device 210 may be a Bluetooth radio, which may comprise suitable logic, circuitry and/or code that may enable communication of data, command and/or status with other Bluetooth devices.

The Bluetooth communication device 210 may comprise a handshaking block 210a and a processor 211. The handshaking block 210a may comprise suitable logic, circuitry and/or code that may enable communication with the WLAN communication device 212 using a coexistence method. The coexistence method may comprise using a plurality of signals, which may include a Priority signal from the Bluetooth device.

The handshaking block 210a may assert and deassert signals according to a particular coexistence method used to indicate whether the Bluetooth device may be executing a task that may be high priority. The coexistence method used may be design and/or implementation dependent. The processor 211 or the processor 220 may control the handshaking block 210a, for example. Some Bluetooth tasks, for example, tasks associated with an SCO link between two Bluetooth devices, may assert a high priority for frames used for SCO packet transfer. FIG. 2 may show that the Priority signal may be communicated to the WLAN communication device 212 for simplicity. The Priority signal, and other signals that may be associated with a coexistence method used, may be communicated to and from, for example, a packet traffic arbitration (PTA) unit 212a.

The WLAN communication device 212 may be a WLAN radio, which may comprise suitable logic, circuitry and/or code that may enable communication of data, command and/or status with other WLAN devices. The processor 220 may comprise suitable logic, circuitry and/or code that may enable communication of data, command and/or status with the Bluetooth communication device 210 and the WLAN communication device 212. The memory 230 may comprise suitable logic and/or circuitry that may enable storage of information, such as, for example, data and/or code, that may be used by other devices.

In operation, the host device 200 may be, for example, the laptop 110 that may be enabled for Bluetooth via the Bluetooth communication device 210, and connected to a LAN via the WLAN communication device 212. The processor 220 may be the main processor for the host device 200. An application that uses the Bluetooth communication device 210 may be a different application than the application that is accessing the LAN via the WLAN communication device 212. Accordingly, the communication devices 210 and 212 may not be coordinated with respect to when each may transmit and/or receive.

A multiwire signaling protocol for a coexistence method, for example, may be used by a Bluetooth communication device 210 and a WLAN communication device 212 to better coordinate RF tasks in order to alleviate interference between the Bluetooth communication device 210 and the WLAN communication device 212. The signaling on the Bluetooth side may be accomplished by, for example, the handshaking block 210a, which may be controlled by, for example, the processor 211 and/or by hardware circuitry in the Bluetooth communication device 210.

For example, the PTA unit 212a may receive signals from the Bluetooth communication device 210 and from the WLAN communication device 212, and may arbitrate which device may have priority for transmission and/or reception during a specific period of time. The PTA unit 212a may communicate to the Bluetooth communication device 210 to indicate whether the Bluetooth communication device 210 may have priority. The PTA unit 212a may also communicate to the WLAN communication device 212 whether it may have priority.

Figure 3A:
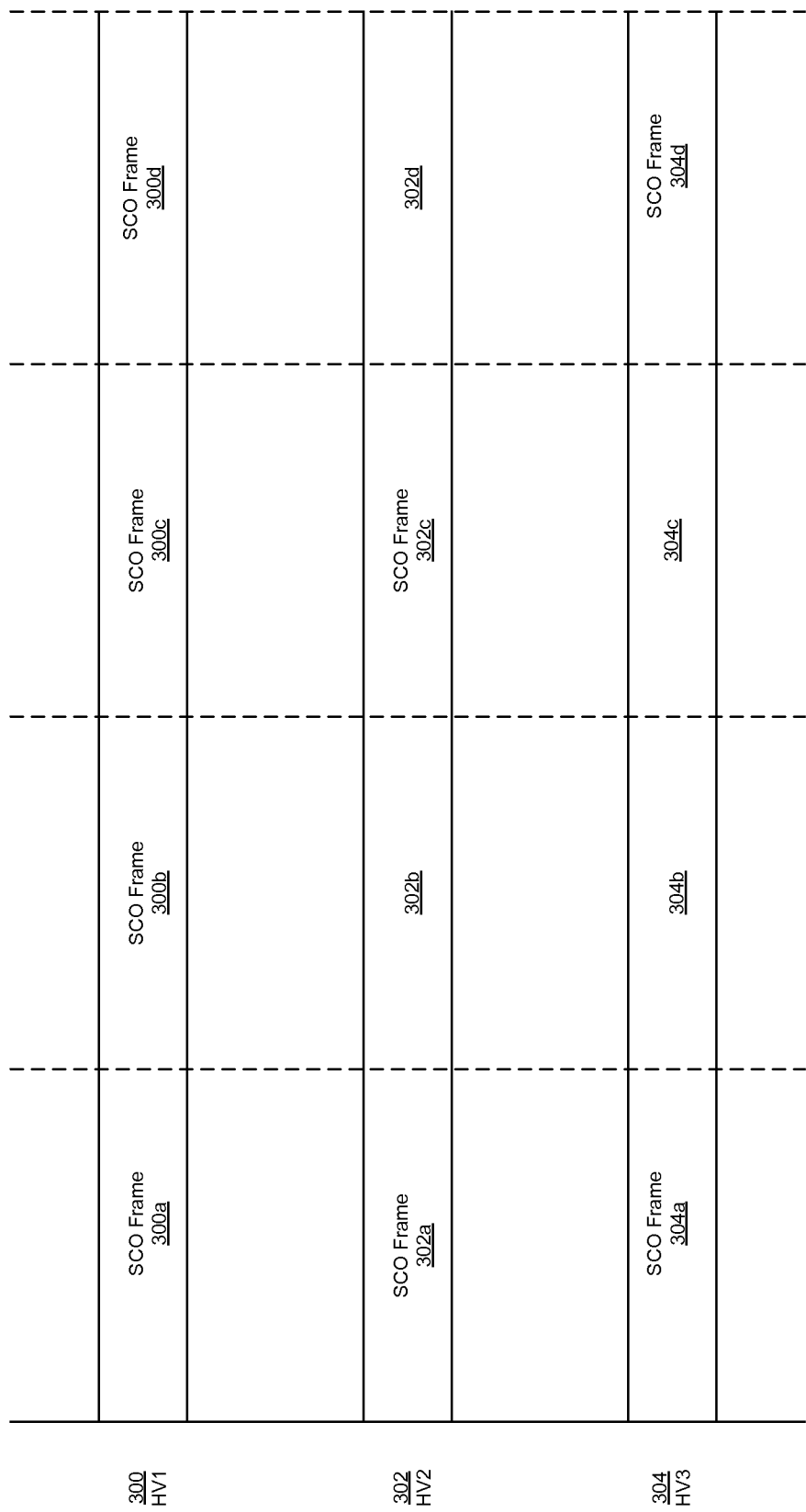
FIG. 3a is a diagram illustrating SCO frames in Bluetooth transmission, in connection with an embodiment of the invention.

FIG. 3a is a diagram illustrating SCO frames in Bluetooth transmission, in connection with an embodiment of the invention. Referring to FIG. 3a, there is shown a diagram 300 of SCO frames when HV1 method is used, a diagram 302 of SCO frames when HV2 method is used, and a diagram 304 of SCO frames when HV3 method is used. The HV1, HV2, and HV3 methods for a SCO link may be used for a variety of conditions that may have different interfering noise. For example, the HV3 method may be used when there is relatively little RF interference, and thus no forward error correction overhead may be needed for the voice data. Accordingly, 30 bytes of information may be transmitted in a packet, and a HV3 packet may be sent every 3 frames.

As RF interference increases, the HV2 method may be used. This method may transmit 20 information bytes per packet, and each packet may be sent every other frame. The HV2 method may also be protected by a ⅔ forward error correction code. As RF interference increases still more, the HV1 method may be used. This method may transmit 10 bytes of information per packet that may be protected by ⅓ forward error correction code. Accordingly, the forward error correction code for the HV1 and the HV2 methods may allow some errors to be corrected, but the throughput may be less. This may be because more frames may be dedicated to transmitting the same number of information bytes. The escalation scheme described for using the HV3, HV2, and HV1 may be exemplary only. For example, the host device 200 may use the HV1 SCO link as a default link.

In the diagram 300, there is shown the SCO frames 300a, 300b, 300c, and 300d. Since every frame may be dedicated to one SCO link, a Bluetooth master device may not be able to communicate with any other Bluetooth slave devices. In the diagram 302, there is shown the SCO frames 302a and 302c, which may be representative of the SCO frames in the HV2 method. Accordingly, every other frame may be used for the SCO link, and the other frames may be used for other purposes. This may include communicating with other Bluetooth devices by the Bluetooth master device during, for example, the frames 302b and 302d.

In the diagram 304, there is shown the SCO frames 302a and 302d, which may be representative of the SCO frames in the HV3 method. Accordingly, every third frame may be used for the SCO link, and the other frames may be used for other purposes. For example, the other frames such as the frames 302b and 302c may be used to communicate with other Bluetooth devices by the Bluetooth master device. Accordingly, it may be seen that various percentage of the frames available may be used for an SCO link. The more frames used for an SCO link, the less a collocated WLAN device may be able to transmit.

Figure 3B:
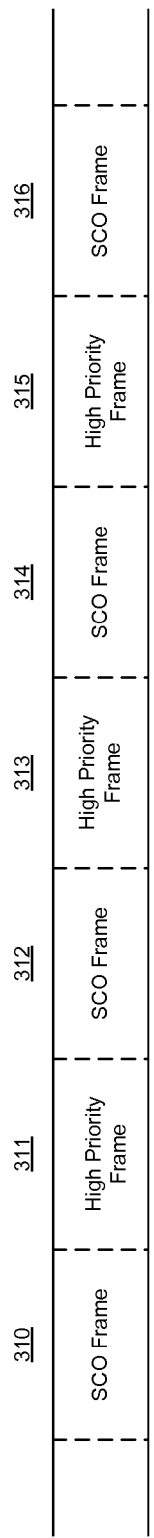
FIG. 3b is a graph illustrating exemplary HV2 SCO link in Bluetooth transmission, in connection with an embodiment of the invention.

FIG. 3b is a graph illustrating exemplary HV2 SCO link in Bluetooth transmission, in connection with an embodiment of the invention. Referring to FIG. 3b, there is shown frames 310, . . . , 316 that may be used for a HV2 method SCO link. Accordingly, every other frame may be allocated to an SCO link. These frames may be, for example, the frames 310, 312, 314, and 316. The Bluetooth communication device 210 may indicate to the collocated WLAN device that these frames may be high priority frames. Accordingly, the WLAN device may decide not to transmit at these times.

A Bluetooth communication device may also have other tasks that may be deemed to be a high priority task, and hence indicate a high priority to the collocated WLAN device. The tasks deemed to be a high priority task may be implementation dependent, but some may be, for example, inquiry scan and page scan. During an inquiry scan, a Bluetooth master device may locate other Bluetooth devices that may be available to connect to its piconet. During a page scan, those Bluetooth devices may be connected to a piconet by the Bluetooth master device for that piconet.

If a page scan task is set for high priority, then the Bluetooth master device may indicate a high priority for the other frames not used for the SCO link in order to use them for page scan. The frames used for page scan may be, for example, the frames 311, 313, and 315. Accordingly, the Bluetooth master device may continuously indicate high priority frames, and thereby keep the collocated WLAN device from transmitting. Therefore, the WLAN device may not be able to transmit until either the SCO link is removed, the Bluetooth master device times out on its page scan, or the Bluetooth device that is searched for during the page scan is located and connected on to the piconet. This may adversely affect the throughput of the WLAN device.

A Bluetooth slave device may also assert the transmission portion of a frame as high priority. This may be described by the U.S. application Ser. No. 11/439,776, which is hereby incorporated herein by reference in its entirety. A Bluetooth slave device may allow a collocated WLAN device to transmit more than a Bluetooth master device since the Bluetooth slave device may only assert high priority for one slot of a non-SCO frame as high priority, rather than assert high priority for both slots of a frame, as a Bluetooth master device might.

Figure 3C:
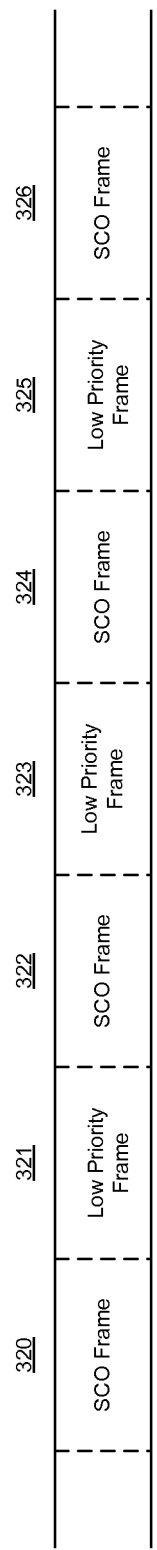
FIG. 3c is a graph illustrating exemplary HV2 SCO link in Bluetooth transmission, in accordance with an embodiment of the invention.

FIG. 3c is a graph illustrating exemplary HV2 SCO link in Bluetooth transmission, in accordance with an embodiment of the invention. Referring to FIG. 3c, there is shown frames 320, . . . , 326. The frames 320, 322, 324, and 326 may be allocated for a HV2 method SCO link. However, in order to allow the collocated WLAN communication device, for example, the WLAN communication device 212, to transmit during the SCO link, the Bluetooth communication device 210 may assign a low priority to the other tasks, such as for example, page scan or inquiry scan.

Accordingly, a Bluetooth device may not indicate to the collocated WLAN device that the frames not used for the SCO link may be high priority frames. In this manner, the alternate frames, such as for example, the frames 321, 323, and 325, may be used by, for example, the WLAN communication device 212 to transmit to other WLAN devices. When the SCO link is no longer active, then the Bluetooth device may assign a high priority to those tasks whose priority may have been lowered when the SCO link was active.

Figure 4:
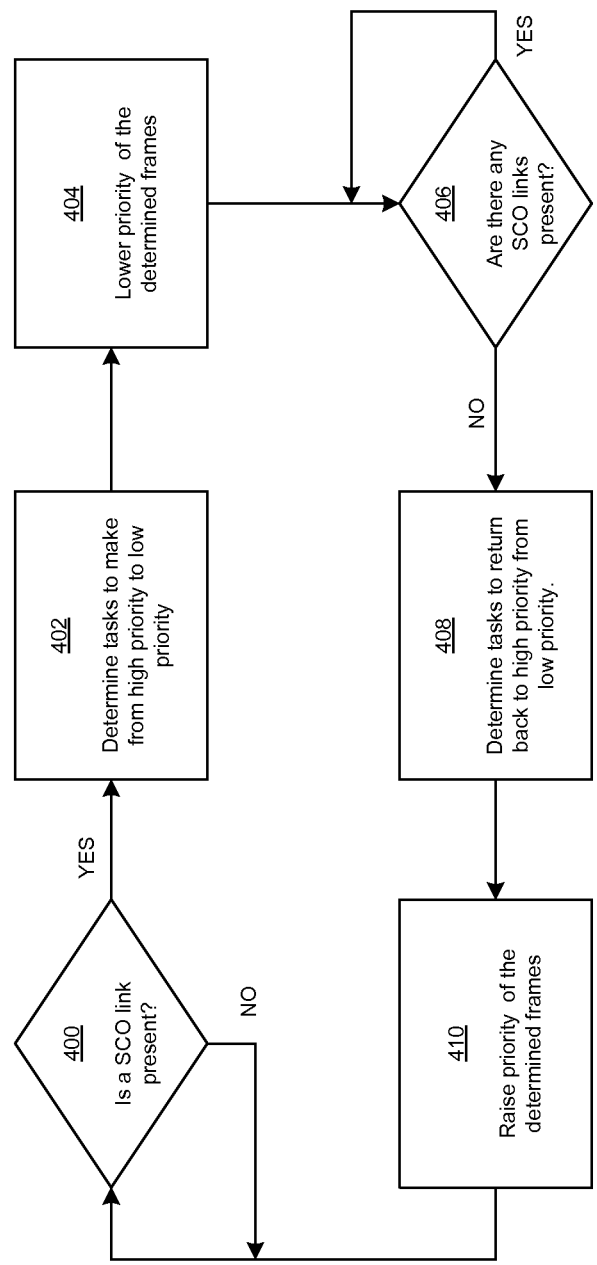
FIG. 4 is a flow chart illustrating exemplary steps for auto coexistence priority selection for a SCO link, in accordance with an embodiment of the invention.

FIG. 4 is a flow chart illustrating exemplary steps for auto coexistence priority selection for a SCO link, in accordance with an embodiment of the invention. Referring to FIG. 4, in step 400, the Bluetooth communication device 210 may determine whether a SCO link with another Bluetooth device is present. If so, the next step may be step 402. If not, the next step may be step 400.

In step 402, the Bluetooth communication device 210 may determine the non-SCO tasks that may be lowered from a high priority to a low priority, where the priority may be communicated to a collocated WLAN device, for example, via the PTA 212a, prior to a packet being transmitted or received by the Bluetooth communication device 210. This may allow, for example, a collocated WLAN device to transmit during the frames that are not used to transmit voice data for the SCO link. In step 404, the Bluetooth communication device 210 may indicate a low priority, for example, via the PTA 212a, to the WLAN device, for example, the WLAN communication device 212, for the frames that are not used to transmit voice data for the SCO link. Accordingly, the collocated WLAN device may be able to transmit during at least a portion of each of the frames that are not used to transmit voice data for the SCO link.

In step 406, the Bluetooth communication device 210 may determine whether there are any SCO links present. If so, the next step may be step 406 again. Otherwise the next step may be step 408. In step 408, the Bluetooth communication device 210 may determine the non-SCO tasks whose priority communicated to the collocated WLAN communication device 212 may be raised from a low priority to a high priority. These tasks may be, for example, the non-SCO tasks determined in step 402. Generally, these tasks may be those that may have a high priority communicated to the WLAN communication device 212 prior to transmitting a packet in a frame. In step 410, the Bluetooth communication device 210 may indicate a high priority to the collocated WLAN device for the frames that may be used for those tasks. Accordingly, when there is no SCO link between, for example, the Bluetooth communication device 210 and another Bluetooth communication device, the Bluetooth communication device 210 may be able to transmit packets at a high priority.

Another embodiment of the invention may provide a machine-readable storage, having stored thereon, a computer program having at least one code section executable by a machine, thereby causing the machine to perform the steps as described above for auto coexistence priority selection for a SCO link.

In accordance with an embodiment of the invention, aspects of an exemplary system may comprise handshaking circuitry, for example, the handshaking block 210a, within a Bluetooth communication device 210. The handshaking block 210a may enable communication of priority with a collocated WLAN communication device 212. The communication of the priority may be made prior to the Bluetooth communication device 210 transmitting and/or receiving a packet in a Bluetooth frame. If a Bluetooth SCO link is present between the Bluetooth communication device 210 and another Bluetooth device, and if a current non-SCO task being handled by the Bluetooth communication device 210 is a high priority task, then the priority communicated by the handshaking block 210a for packets associated with the current non-SCO task may be low priority. A non-SCO task may be a task that does not comprise transfer of SCO packets. The SCO link may be a HV2 SCO link or a HV3 SCO link.

Execution of the non-SCO task may comprise transmitting and/or receiving at least one Bluetooth packet in at least one Bluetooth frame. The Bluetooth communication device 210 may operate as a master and the other Bluetooth device may operate as a slave. Alternatively, the Bluetooth communication device 210 may operate as a slave and the other Bluetooth device may operate as a master.

If a Bluetooth SCO link is not present between the Bluetooth communication device 210 and the other Bluetooth device, and if the current non-SCO task being handled by the Bluetooth communication device 210 is a high priority task, the handshaking block 210a may communicate a high priority using the coexistence interface prior to the Bluetooth communication device 210 executing the non-SCO task.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A device comprising:
   at least one processor circuit configured to:
   receive a task from a co-located first device, wherein the task is assigned a high priority by the first device and the task is performed without a point-to-point link;
   determine whether the point-to-point link with a second device is currently present;
   reassign the assigned high priority to a low priority if the point-to-point link is determined to be present;
   communicate a low priority signal corresponding to the reassigned low priority with regard to the task via a coexistence method with a co-located third device if the point-to-point link is determined to be present; and
   communicate a high priority signal corresponding to the assigned high priority with regard to the task via the coexistence method with the co-located third device if the point-to-point link is determined to be not present.

2. The device of claim 1, wherein the at least one processor circuit is further configured to:
   after communicating the low priority signal, transitioning priority from the low priority to the high priority when the point-to-point link is determined to no longer be present.

3. The device of claim 1, wherein the at least one processor circuit is further configured to:
   after communicating the high priority signal, transitioning priority from the high priority to the low priority when the point-to-point link is determined to be present.

4. The device of claim 1, wherein the at least one processor circuit is further configured to:
   enable transmission of the co-located third device based at least on the communicated high or low priority signal of the task.

5. The device of claim 1, wherein the at least one processor circuit is further configured to:
   initiate execution of the task.

6. The device of claim 1, wherein the task is associated with a first type of packets and the point-to-point link is associated with a second type of packets, the second type of packets being associated with a higher priority than the first type of packets.

7. A method comprising:
   receiving, at a traffic arbitration device, a task from a first device co-located with the traffic arbitration device, wherein the task is assigned a high priority by the first device and the task is exclusive of transmitting a first type of packets;
   determining, by the traffic arbitration device, a link with a second device for transmitting the first type of packets is currently present;
   reassigning, by the traffic arbitration device, the assigned high priority of the task to a low priority when the link is determined to be present;
   communicating, by the traffic arbitration device, a first signal corresponding to the reassigned low priority with regard to the task via a coexistence method with a co-located third device when the link is determined to be present; and
   communicating, by the traffic arbitration device, a second signal corresponding to the assigned high priority with regard to the task via the coexistence method with the co-located third device when the link is determined to be not present.

8. The method of claim 7, wherein the first device transmits on a first channel having a first bandwidth and the co-located third device transmits on a second channel having a second bandwidth that is greater than the first bandwidth.

9. The method of claim 7, further comprising:
   after communicating the first signal, transitioning priority of the task, by the traffic arbitration device, from the low priority to the high priority when the link is determined to no longer be present.

10. The method of claim 7, further comprising:
    after communicating the second signal, transitioning priority of the task from the high priority to the low priority when the link is determined to be present.

11. The method of claim 7, further comprising enabling transmission of the co-located third device based at least on the communicated first or second signal associated with the task.

12. The method of claim 7, further comprising executing the task.

13. The method of claim 12, wherein the executing of the task comprises at least one of transmitting at least one packet in at least one frame or receiving at least one packet in at least one frame.

14. The method of claim 7, wherein the link comprises a point-to-point link and the task comprises a point to multi-point task.

15. A computer program product comprising instructions stored in a tangible non-transitory computer-readable storage medium, the instructions comprising:
   instructions to receive, by a traffic arbitration device, a task from a first device co-located with the traffic arbitration device, wherein the task is assigned a high priority by the first device and the task is associated with transmitting a first type of packets;
   determining, by the traffic arbitration device, whether a link with a second device for transmitting a second type of packets is currently present, wherein the second type of packets are associated with a higher priority than the first type of packets;
   reassigning, by the traffic arbitration device, the assigned high priority of the task to a low priority if the link is determined to be present;
   communicating, by the traffic arbitration device, a first signal corresponding to the reassigned low priority with regard to the task via a coexistence method with a co-located third device if the link is determined to be present; and
   communicating, by the traffic arbitration device, a second signal corresponding to the assigned high priority with regard to the task via the coexistence method with the co-located third device if the link is determined to be not present.

16. The computer program product of claim 15, wherein the instructions further comprise:
   instructions to, after communicating the first signal, transitioning priority of the task, by the traffic arbitration device, from the low priority to the high priority when the link is determined to no longer be present.

17. The computer program product of claim 15, wherein the instructions further comprise:
   instructions to, after communicating the second signal, transitioning priority of the task from the high priority to the low priority when the link is determined to be present.

18. The computer program product of claim 15, wherein the instructions further comprise:
   instructions to enable transmission of the co-located third device based at least on the communicated first or second signal of the task.

19. The computer program product of claim 15, wherein the instructions further comprise:
   instructions to initiate execution of the task.

20. The computer program product of claim 15, wherein the link comprises a point-to-point link and the task comprises a point to multi-point task.

* * * * *